(12) United States Patent
Swanson

(10) Patent No.: US 8,875,541 B2
(45) Date of Patent: Nov. 4, 2014

(54) DEVICE FOR POSITIONING A NECKLACE

(76) Inventor: Sandra Lynne Swanson, Charlotte, NC (US)

( * ) Notice: Subject to any disclaimer, the term of this patent is extended or adjusted under 35 U.S.C. 154(b) by 256 days.

(21) Appl. No.: 13/466,513

(22) Filed: May 8, 2012

(65) Prior Publication Data

US 2012/0284964 A1   Nov. 15, 2012

Related U.S. Application Data

(60) Provisional application No. 61/484,000, filed on May 9, 2011, provisional application No. 61/601,719, filed on Feb. 22, 2012.

(51) Int. Cl.
*A44C 25/00* (2006.01)
*F16B 11/00* (2006.01)
*A44C 5/00* (2006.01)
*A44C 15/00* (2006.01)

(52) U.S. Cl.
CPC ............. *F16B 11/006* (2013.01); *A44C 5/0007* (2013.01); *A44C 25/00* (2013.01); *A44C 15/005* (2013.01); *Y10S 63/01* (2013.01)
USPC ........................................ 63/1.18; 63/DIG. 1

(58) Field of Classification Search
USPC ........................................ 63/1.18, DIG. 1, 33
See application file for complete search history.

(56) References Cited

U.S. PATENT DOCUMENTS

| | | | |
|---|---|---|---|
| 2,096,389 A * | 10/1937 | Bode | 428/42.2 |
| 2,879,567 A | 3/1959 | O'Connell | |
| 5,081,853 A | 1/1992 | Salyer | |
| 5,279,132 A | 1/1994 | Swaim | |
| 6,079,224 A * | 6/2000 | Schehr | 63/12 |
| 2002/0020190 A1 | 2/2002 | Clark et al. | |
| 2007/0054081 A1 | 3/2007 | DeMarco | |

* cited by examiner

*Primary Examiner* — Jack W Lavinder
(74) *Attorney, Agent, or Firm* — Moore and Van Allen, PLLC; Nicholas C. Russell

(57) ABSTRACT

Embodiments of the present invention provide apparatuses for positioning a piece of jewelry and methods of making said apparatuses. The jewelry may include a necklace, bracelet, and/or anklet. The apparatus may be placed over the clasp of a piece of jewelry and then be attached to the skin of the individual wearing the necklace. In this way, the apparatus prevents the movement of the clasp of the piece of jewelry from a desirable location to an undesirable location, where the clasp may detract from the beauty of the piece of jewelry. Further, the apparatus may come in many shapes, sizes, colors, etc., such that the device may provide for a stylish accessory for the individual wearing the device.

9 Claims, 17 Drawing Sheets

DEVICE FOR POSITIONING A NECKLACE

CLAIM OF PRIORITY UNDER 35 U.S.C. §119

This Non-provisional Patent Application claims priority to Provisional Patent Application Ser. No. 61/601,719 titled "A Device for Positioning Jewelry and Method for Making the Same" filed on Feb. 22, 2012, and Provisional Patent Application Ser. No. 61/484,000 titled "A Device for Positioning Jewelry and Method for Making Same" filed on May 9, 2011 hereby expressly incorporated by reference herein.

BACKGROUND

Necklaces and other chain jewelry, such as bracelets or anklets, have been worn since the time of ancient civilizations. Necklaces continue to be a popular jewelry selection today. Necklaces are worn for a multitude of reasons, including ornamental reasons, religious reasons, sentimental reasons, personal reasons, or as accessories.

Necklaces, bracelets, and anklets typically consist of a rope like chain. The chain connects together to form a continuous loop. The loop is then worn around an individual's neck, wrist, or ankle. The connection to form the continuous loop is usually made by some type of clasping mechanism that secures the necklace in a loop configuration. Typically, the clasp is a large hook or latch that hooks one side of the chain to the other to form the loop configuration.

When an individual is wearing a necklace, inevitably the clasp of the necklace will work its way to the front of the neck or chest. When the individual looks in a mirror or other individuals see the clasp of the necklace in front of the neck or chest, it detracts from the beauty of the necklace.

Currently, if an individual wishes to keep the clasp of the necklace from working its way to the front of the neck or chest, the individual either continues to manually move the clasp of the necklace or may use a clear glue like substance to secure the clasp in place. Although glue secures the clasp to the back of the neck of the individual and ensures that the clasp will not work its way to the front of the neck or chest, the glue builds a residue on the clasp itself. The residue builds up over time and eventually leads to clasp malfunction.

Accordingly, there is a long-felt but unmet need to provide an apparatus that is practical and yet stylish, to prevent the clasp of the necklace from working its way in front of the neck or chest, and a method of making same.

SUMMARY

Embodiments of the invention may provide a solution to the above-described problem and/or other problems by providing methods and apparatuses for positioning a piece of jewelry.

According to one embodiment, the device prevents a clasp on jewelry, including necklaces, bracelets, anklets, or the like, from working its way from a desired location into a more pronounced, undesirable location. For example, the clasp on a necklace moving from behind the neck of the individual wearing the necklace to in front of the neck or chest of the individual wearing the necklace.

Having the clasp of a piece of jewelry work its way to an undesirable location may be unattractive and may take away from the beauty of the jewelry. The present invention provides a means of securing the clasp of a piece of jewelry in a location desired by the individual wearing that jewelry. In this way, the clasp of the piece of jewelry will be unable to work its way to an undesirable location through the course of a day of wearing the jewelry.

In some embodiments of the invention, the device may comprise several layers. The layers may include a padded layer, an adhesive layer, a material layer, a fabric layer, and/or a decorative layer. The layers allow the device to be flexible and form the shape of any location the individual may wish to place it. In other embodiments of the invention, the layers may include alternative methods of attachment such as a layer comprising a self-securing silicone or specialized plastic that is non-adhesive, allowing the material to be mechanically bonded to the skin, similarly coupled with an optional padded layer centrally, a material layer, a fabric layer, and/or a decorative layer. The silicone layer allows the device to be breathable and skin-like which additionally contributes to the overall comfort and flexibility. The padded layer provides protection to the jewelry. The chemical or mechanical adhesive layer allows the device to be easily applied and removed due to its pressure sensitive adhesive nature. The material layer, fabric layer, and decorative layer all allow the device to be provided to the individual in various colors, patterns, styles, etc. allowing an infinite number of possibilities.

The device is also easy to use. The individual may place a piece of jewelry in a desired location, such as putting a necklace around her neck. Once the piece of jewelry is in the desired location the individual may select the device she wishes to wear for the day. The device may come in various shapes, materials, fabrics, colors, patterns, styles, etc. Once the shape, material, color, pattern, and/or style is selected, the individual may remove the removable non-adhesive film from the adhesive layer of the device and place the device over the clasp of the jewelry in such a way that the clasp is centered under the device.

The device may then be bound chemically via adhesive or mechanically via self-securing plastic or silicone utilizing static electricity/friction on the skin of the individual wearing the jewelry by the individual exerting pressure on the device. The bound device may prevent the clasp of the jewelry from moving to an undesired location for an extended period of time. Once the individual no longer wishes to wear the jewelry, the device may be removed by peeling the adhesive layer or non-adhesive layer away from the skin. The adhesive layer will not leave any residue on the skin or the jewelry after it has been used.

Furthermore, the device may provide added style or beauty to the jewelry itself or to the individual wearing the jewelry by providing a decorative layer in various different shapes, colors, patterns, styles, etc. so that the individual may tailor the device to the individual's specific needs or likes. For example, if the individual wearing the device is a breast cancer survivor, she may wish to prominently display the pink ribbon in support of breast cancer awareness. In this way, the device may be designed with a rectangular piece of silicone as the material with the pink breast cancer awareness ribbon attached centrally. Further, the device may be manufactured in such a way that many different shapes, sizes, materials, decorations, and added scenting may be created.

In some embodiments of the invention, the device may be positioned in such a way to be hidden from other individuals' view. For example, the device may be clear. The individual wearing the device will place the device over a clasp on the back of the neck. In this way, the clear device may be not be noticeable by other individuals either due to the clear coloring of the device, the hair of the individual, a clothing collar, or a combination thereof Furthermore, in this sense the device will not obstruct the view of body art, such as a tattoo, that the individual does not intend to cover. In other embodiments of the invention, the device may be positioned in such a way to be noticed by other individuals, even when placed on the back of the neck. For example, the device may be designed in a specific color and pattern. It may match or complement the clothing of the individual wearing the device. In this way, the individual may wish to attach the device over the clasp of a necklace in such a way that the device is noticeable to other individuals. In this configuration the device may further add to the beauty of the piece of jewelry or the clothing of the individual.

The added style or beauty may be achieved in several ways. The device may be designed in shapes, sizes, colors, patterns, styles, scents, etc., such that the device may provide an attractive accessory to the piece of jewelry, as well as providing the function of positioning the jewelry in a desired location for the user.

In alternative embodiments of the invention, the device may have a groove within it. The groove may be located on the bottom/skin side of the center of the device, such that the groove may provide a place for the chain and clasp of the necklace to be placed within. In this way, the device may rest over the necklace without the device showing a noticeable crease or ridge in it.

In alternative embodiments of the invention, the adhesive layer may comprise a soft plastic or silicone having similar properties of a groove. The soft plastic or silicone may be flexible such that it will conform to the shape of any necklace chain or clasp pressed into it. In this way, the device may be compatible with a wide range of clasps and jewelry.

In other alternative embodiments of the invention, the device may be designed in the shape of an "I". In this way, the upper portion of the "I" may adhere to the skin of the individual, leaving the stem and lower portion unattached. The individual may then place the clasp of the jewelry over the stem of the "I" such that the clasp would be located in the middle of the stem. The lower portion of the "I" may be folded up and adhered to the upper portion in such a way that the clasp of the jewelry may be completely enclosed by the stem of the "I" and secured in place. In this embodiment, the term "I" is used for descriptive purposes, the upper and lower portions of the "I" may be any shape or mirror image of that shape, such that when the lower portion is folded over the stem, a shape is formed.

BRIEF DESCRIPTION OF THE DRAWINGS

Figure 1:
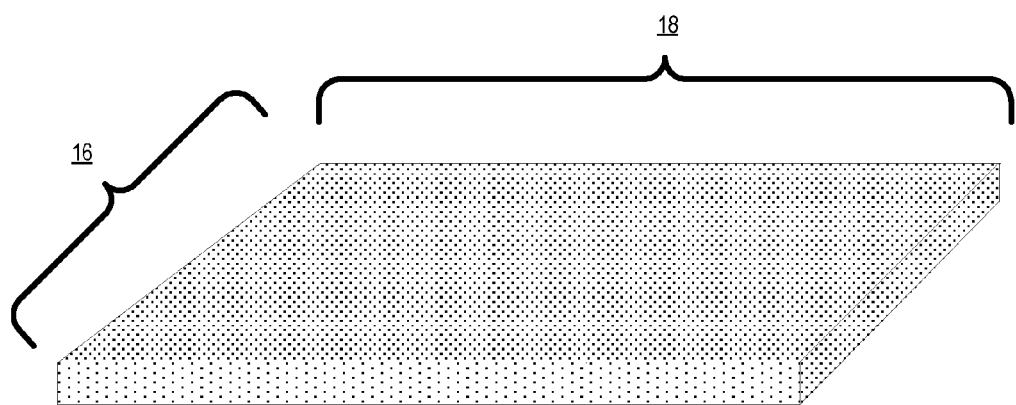
Figure 2:
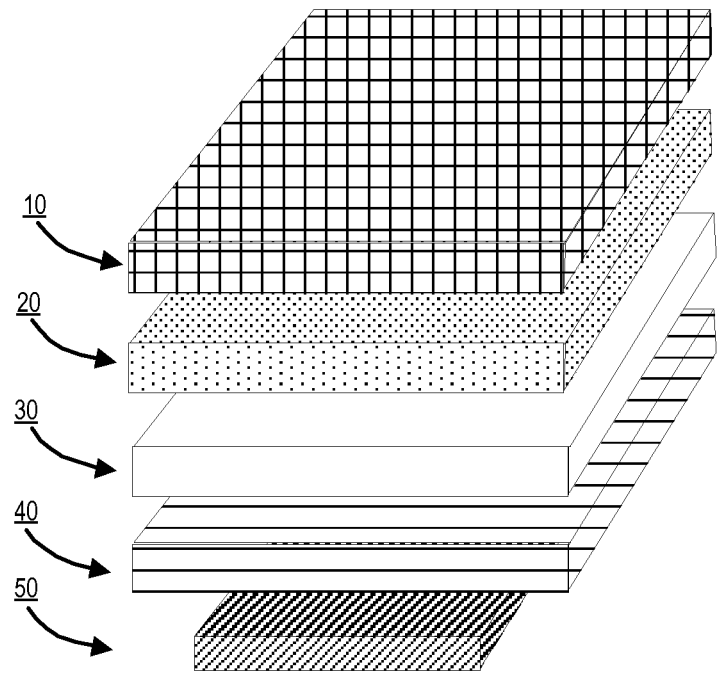
Figure 3:
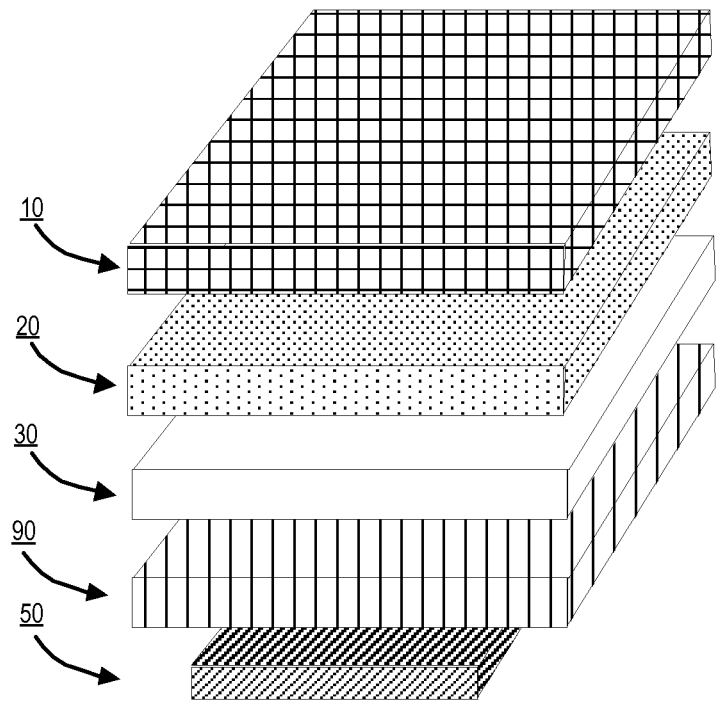

Having thus described embodiments of the invention in general terms, reference will now be made to the accompanying drawings, which are not necessarily drawn to scale, and wherein:

FIG. 1 provides a perspective view of the necklace positioning device, in accordance with one embodiment of the present invention;

FIG. 2 provides an exploded view of the necklace positioning device, in accordance with an embodiment of the invention;

FIG. 3 provides an exploded view of the necklace positioning device, in accordance with an embodiment of the invention.

Figure 4A:
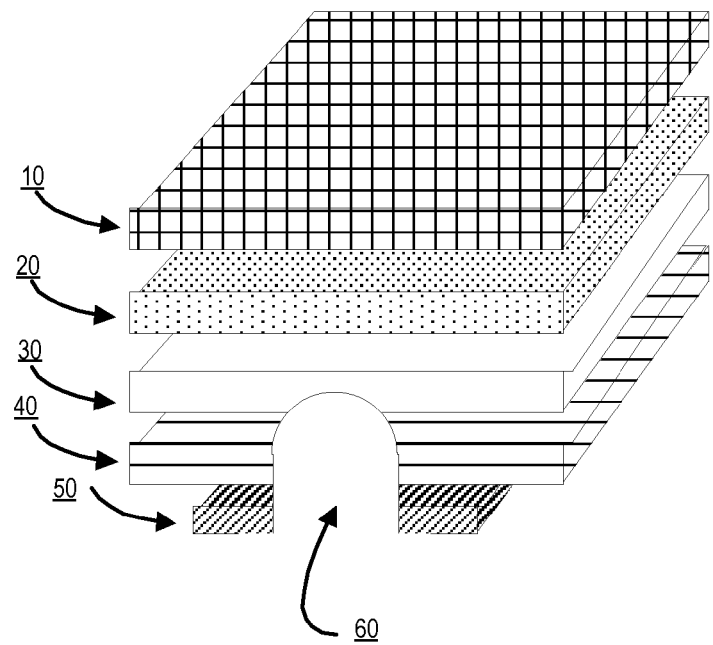
Figure 4B:
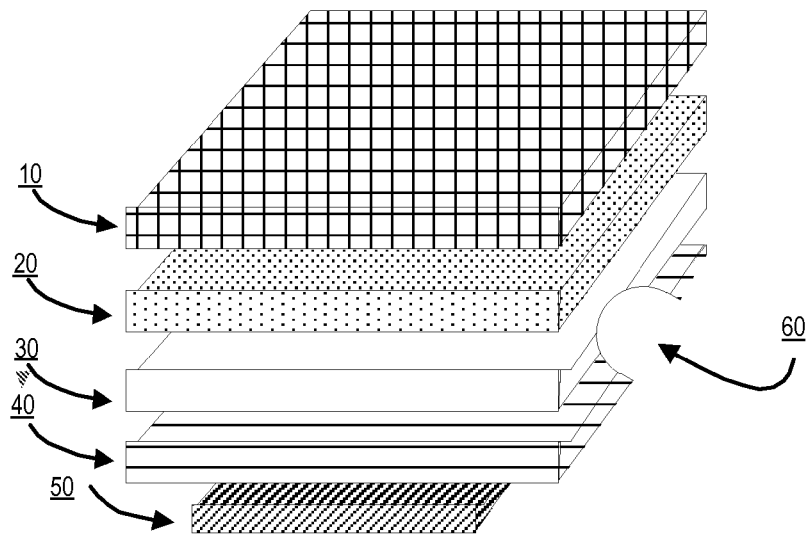
Figure 5:
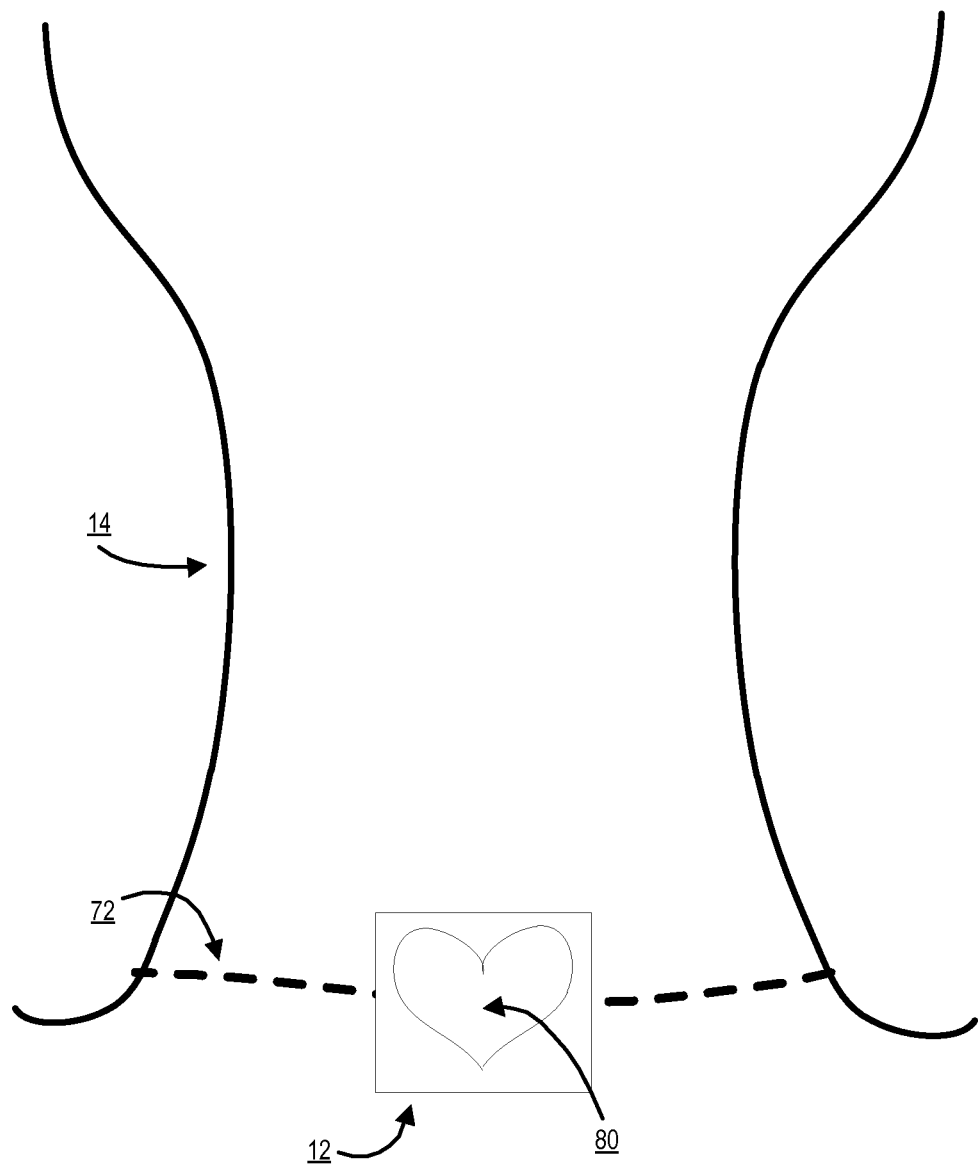
Figure 6:
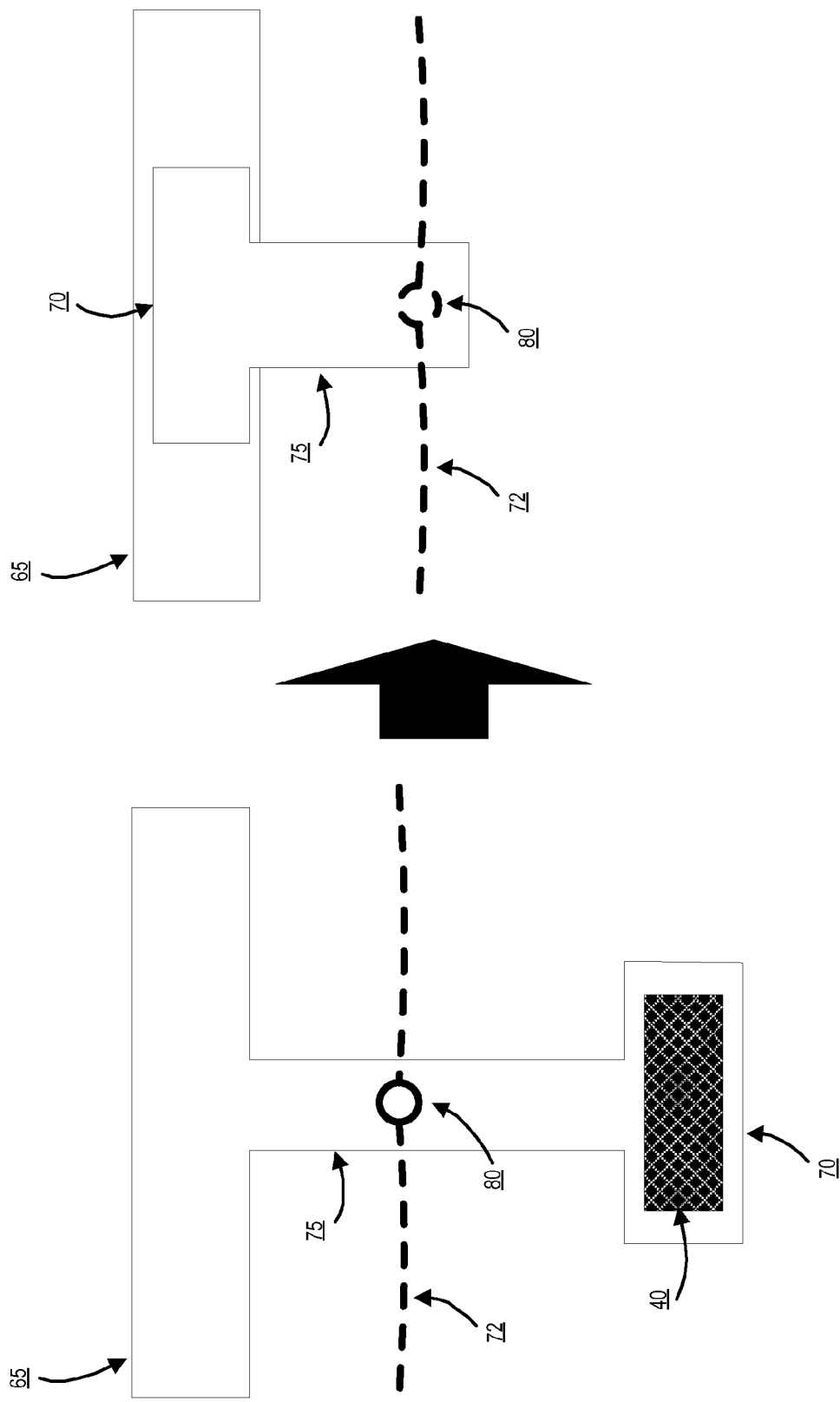

FIG. 4a-4b provides an exploded view of the necklace positioning device, in accordance with an embodiment of the invention;

FIG. 5 provides a top view of the necklace positioning device in use, in accordance with an embodiment of the invention;

FIG. 6 provides a perspective view of an alternative embodiment of the necklace positioning device, in accordance with an embodiment of the invention;

FIGS. 7a-7k provide a top view of the necklace positioning device, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

This disclosure is written in terms of a device for positioning a piece of jewelry. It is understood that the invention is meant to provide some form of security for jewelry that may be loosely worn on an individual. In some embodiments, this jewelry has a clasp. The jewelry this device is intended to position may include, but is not limited to necklaces, bracelets, anklets, belts, and/or the like.

Embodiments of the present invention will now be described with regard to FIGS. 1-7.

FIG. 1 generally represents a perspective view of a device for positioning jewelry in accordance with one embodiment of the present invention. In this embodiment, the device is rectangular or oblong in shape. The rectangular shape of the device consists of a length 18 and a width 16. For rectangular or oblong shaped devices the length 18 may be, but is not limited to a minimum of seven-eighths of an inch (⅞) long. It could be thirteen-sixteenths of an in (13/16) long. The width 16 may be, but is not limited to a minimum of three-eighths of an inch (⅜) wide. It could be five-sixteenths (5/16) of an inch wide. The minimum length and width provides the device adequate coverage of the clasp of the jewelry and adequate securing surface to provide the device attachment to the skin of the individual for up to several days.

Figure 7A:
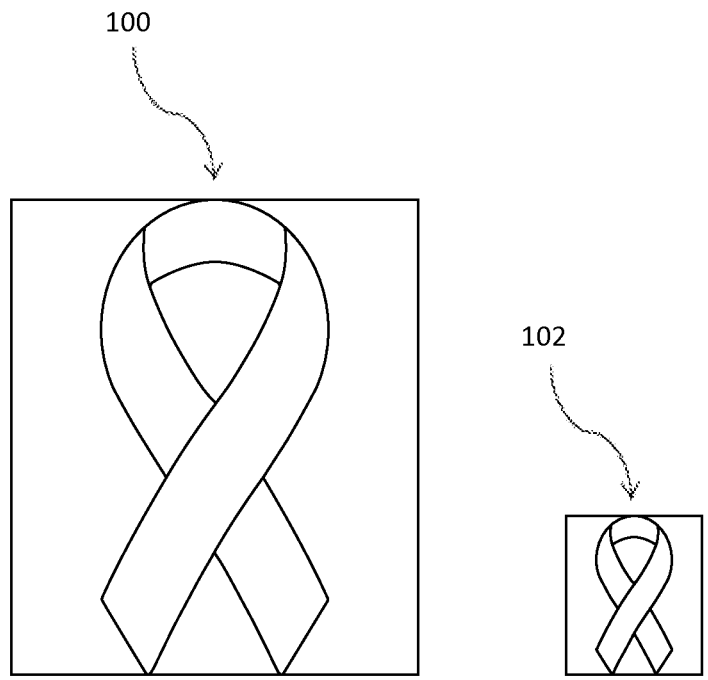
Figure 7B:
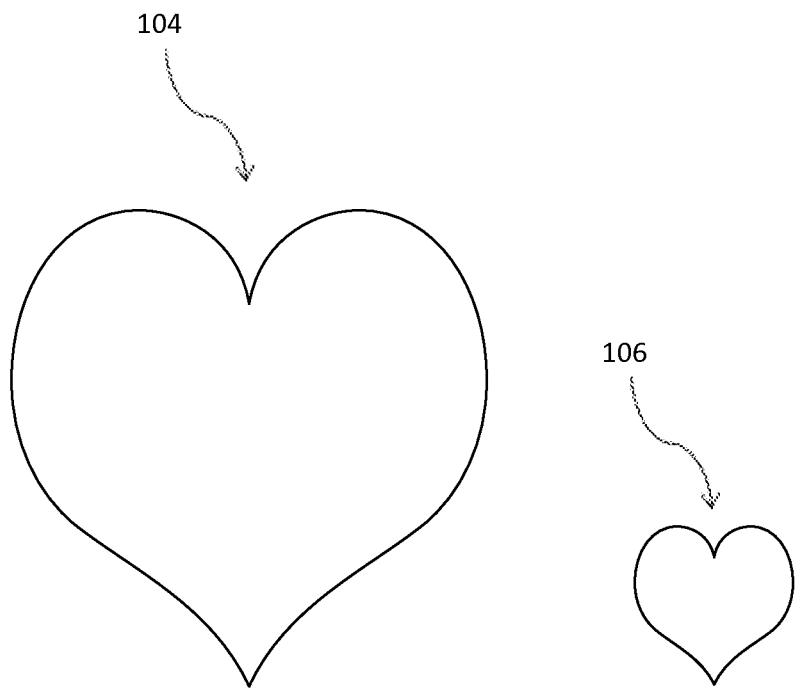
Figure 7C:
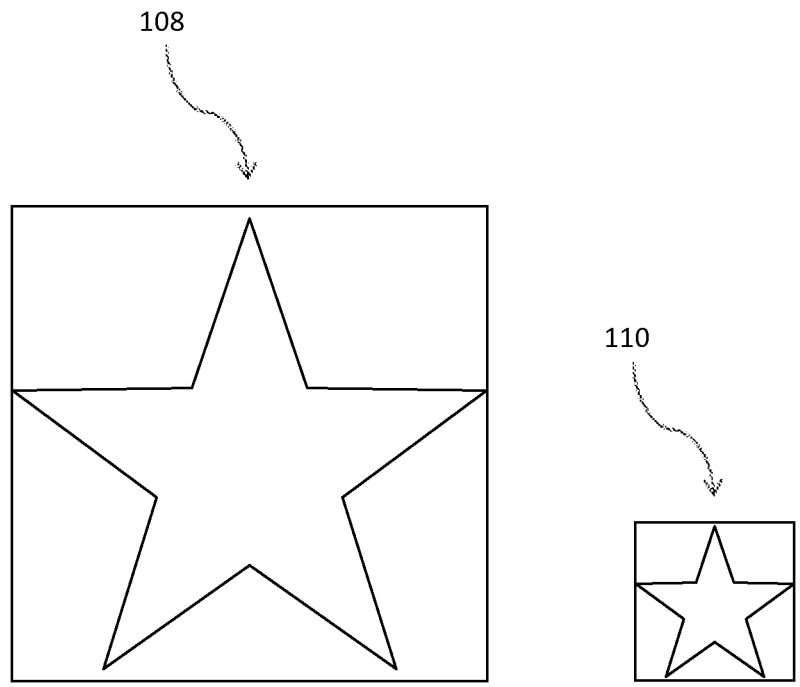
Figure 7D:
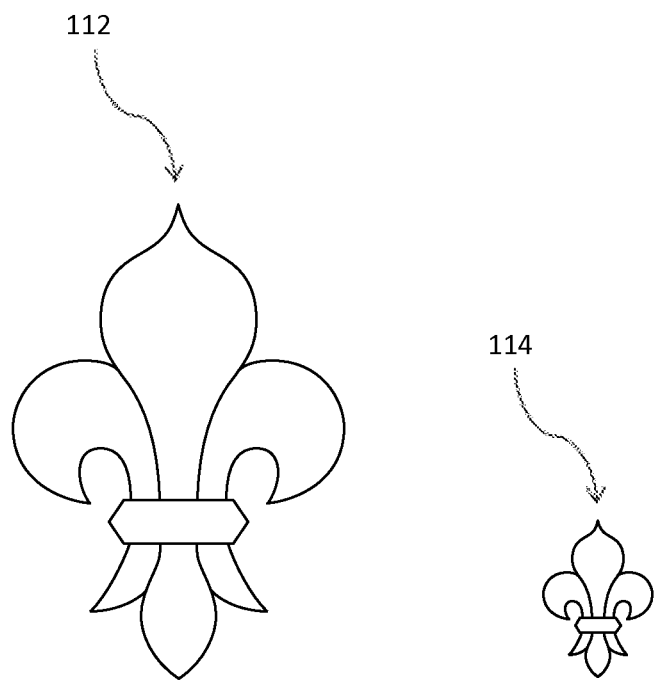
Figure 7E:
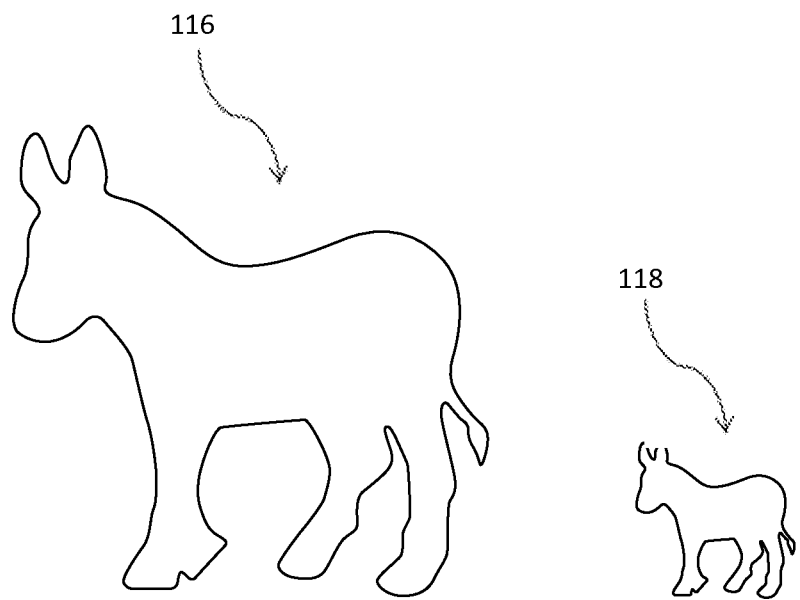
Figure 7F:
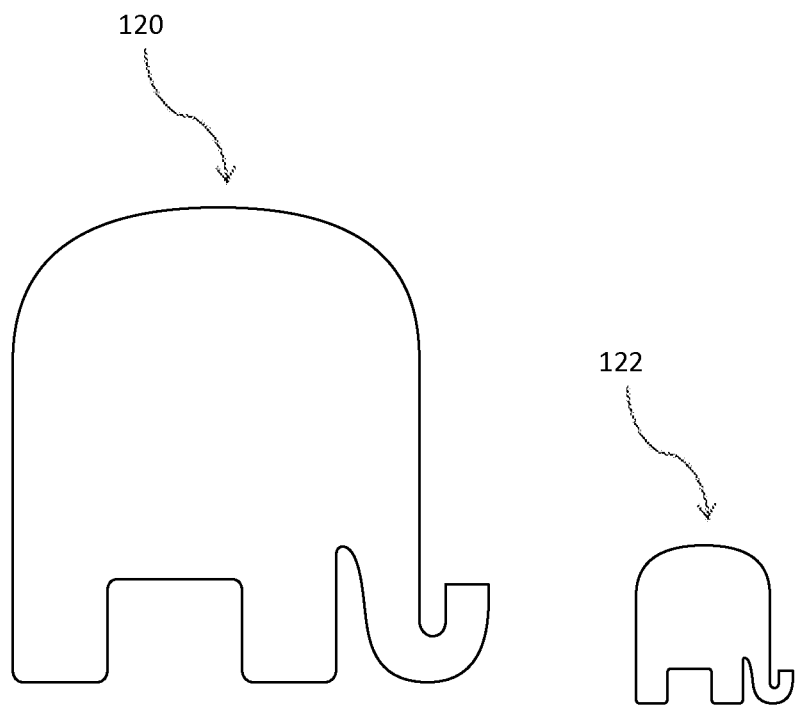
Figure 7G:
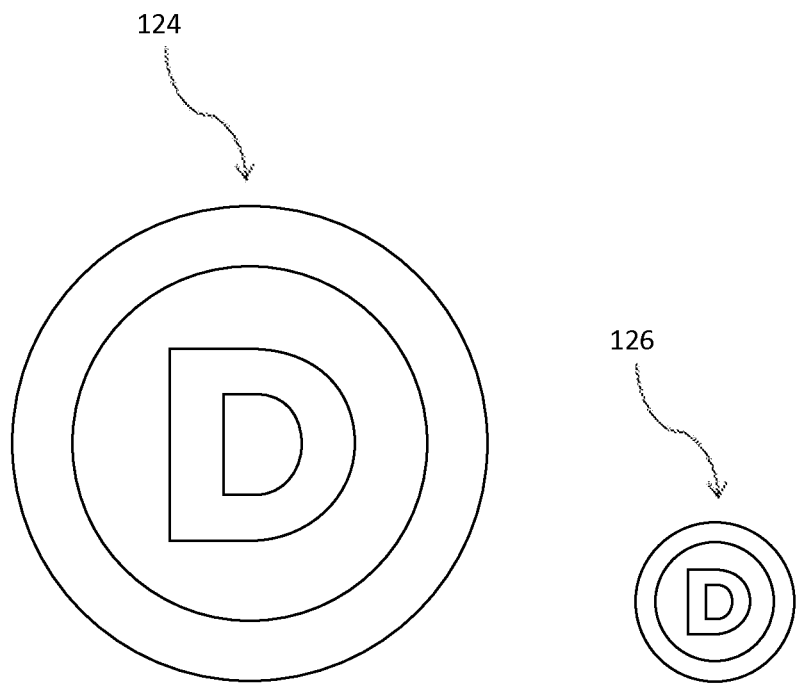
Figure 7H:
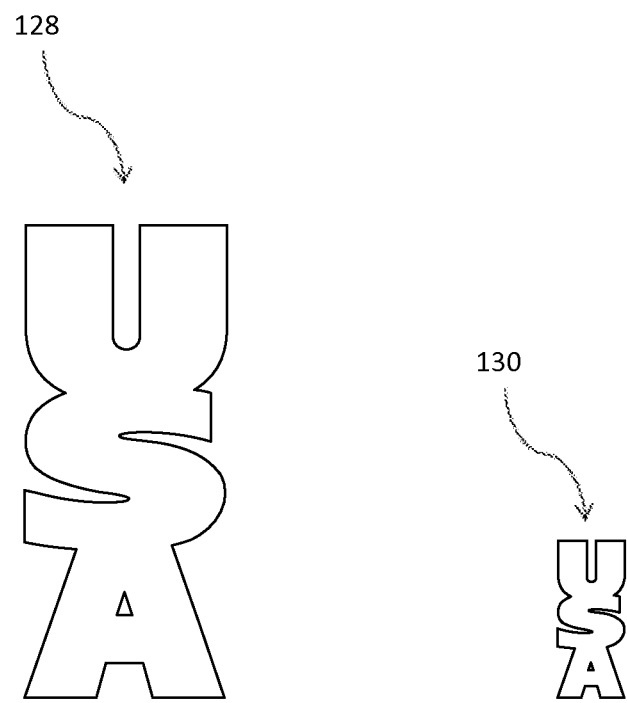
Figure 7I:
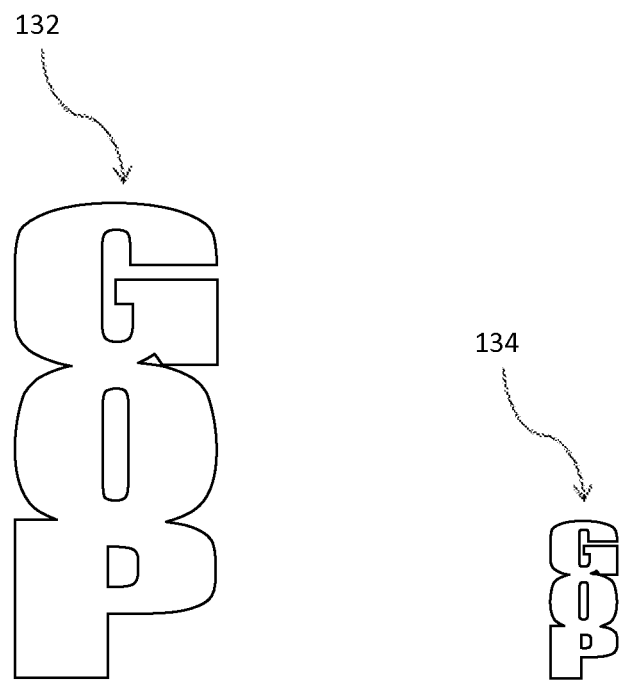
Figure 7J:
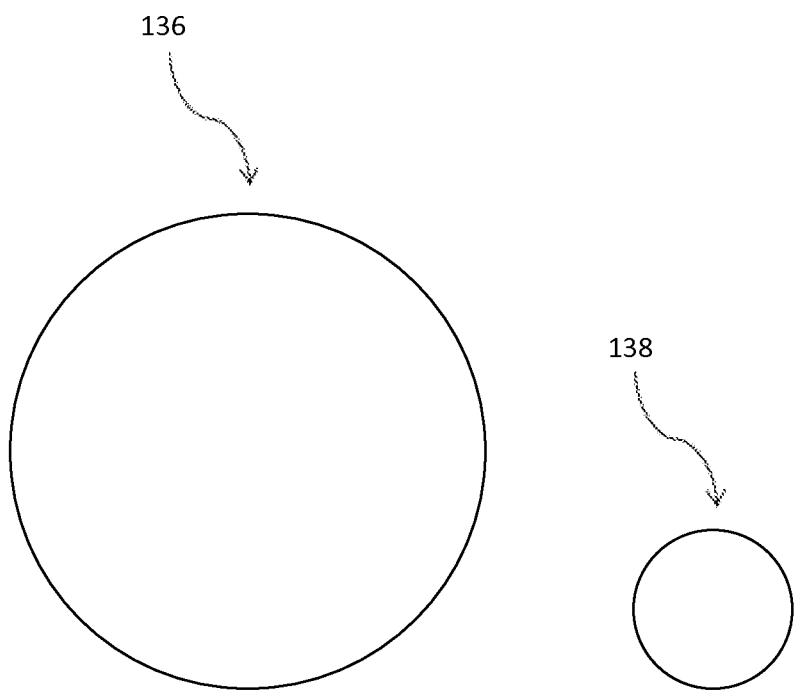
Figure 7K:
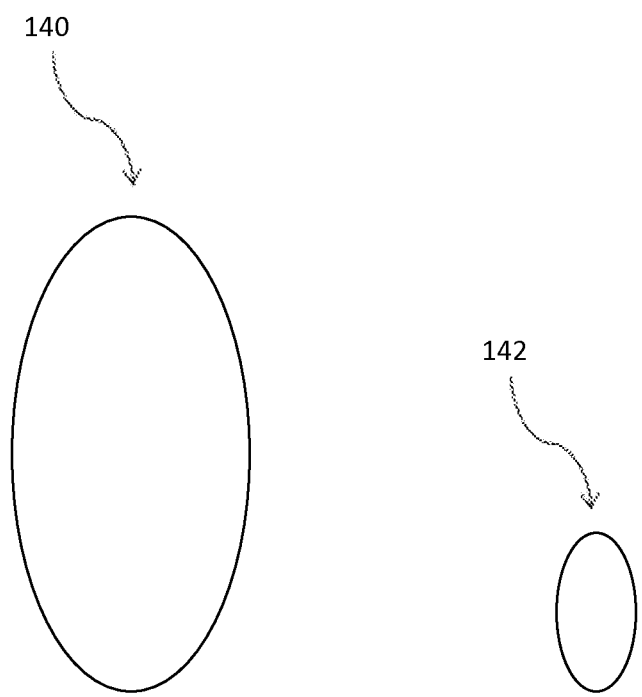

In some embodiments of the invention, the shape of the device varies. The device may be provided to the individual in an assortment of shapes other than the rectangular or oblong shaped disclosed in FIG. 1. Some of the shapes of the device are depicted in FIG. 7a-7k. FIG. 7a illustrates a ribbon shaped device, in accordance with one embodiment of the invention. FIG. 7a illustrates an exploded view of a ribbon shape 100 as well as a ribbon shape reflecting the dimensions of the preferred embodiment 102. The dimensions of the ribbon shape 102 comprise a minimum length of seven-eighths of an inch (⅞) long and a minimum of three-eighths of an inch (⅜) wide. The ribbon shaped device may be manufactured in an assortment of colors and/or textures. In one embodiment of the invention, the ribbon shaped device may be manufactured in the color pink to represent Breast Cancer Awareness. FIG. 7b illustrates a heart shaped device, in accordance with one embodiment of the invention. FIG. 7b illustrates an exploded view of a heart shape 104 as well as a heart shape reflecting the dimensions of the preferred embodiment 106. The dimensions of the heart shape 106 comprise a minimum length of seven-eighths of an inch (⅞) long and a minimum of three-eighths of an inch (⅜) wide. The heart shaped device may be manufactured in an assortment of materials, colors, fabrics and/or textures. FIG. 7c illustrates a star shaped device, in accordance with one embodiment of the invention. FIG. 7c illustrates an exploded view of a star shape 108 as well as a star shape reflecting the dimensions of the preferred embodiment 110. The dimensions of the star shape 110 comprise a minimum length of seven-eighths of an inch (⅞) in diameter. The star shaped device may be manufactured in an assortment of materials, colors, textiles, and/or decorations. In one embodiment of the invention, the star shaped device may be manufactured using glitter and/or other aesthetically pleasing materials. FIG. 7d illustrates a simplified fleur-de-lis shaped device, in accordance with one embodiment of the invention. FIG. 7d illustrates an exploded view of a fleur-de-lis shape 112 as well as a fleur-de-lis shape reflecting the dimensions of the preferred embodiment 114. The dimensions of the fleur-de-lis shape 114 comprise a minimum length of seven-eighths of an inch (⅞) long and a minimum of three-eighths of an inch (⅜) wide. The fleur-de-lis shaped device may be manufactured in an assortment of colors and/or textures. In one embodiment of the invention, the fleur-de-lis shaped device may be manufactured in the colors black and/or gold and worn as football paraphernalia. FIG. 7e illustrates a donkey shaped device, in accordance with one embodiment of the invention. FIG. 7e illustrates an exploded view of a donkey shape 116 as well as donkey shape reflecting the dimensions of the preferred embodiment 118. The dimensions of the donkey shape 118 comprise a minimum length of seven-eighths of an inch (⅞) long and a minimum of three-eighths of an inch (⅜) wide. The donkey shaped device may be manufactured in an assortment of colors and/or textures. In one embodiment of the invention, the donkey shaped device may be manufactured using a fur-like material as to mimic the texture of an actual donkey. FIG. 7f illustrates an elephant shaped device, in accordance with one embodiment of the present invention. FIG. 7f illustrates an exploded view of an elephant shape 120 as well as an elephant shape reflecting the dimensions of the preferred embodiment 122. The dimensions of the elephant shape 122 comprise a minimum length of seven-eighths of an inch (⅞) long and a minimum of three-eighths of an inch (⅜) wide. The elephant shaped device may be manufactured in an assortment of colors and/or textures. In one embodiment of the invention, the elephant shaped device may be manufactured using an elephant skin-like material as to mimic the texture of an actual elephant. FIG. 7g illustrates a "D" shaped device, in accordance with one embodiment of the invention. FIG. 7g illustrates an exploded view of a "D" shape 124 as well as a "D" shape reflecting the dimensions of the preferred embodiment 126. The dimensions of the "D" shape 126 comprise a minimum length of seven-eighths of an inch (⅞) in diameter. The "D" shaped device may be manufactured in an assortment of colors and/or textures. The "D" shaped device may be interchanged with any letter of the alphabet as to provide additional embodiments of the invention. FIG. 7h illustrates a "USA" shaped device, in accordance with one embodiment of the invention. FIG. 7h illustrates an exploded view of a "USA" shape 128 as well as a "USA" shape reflecting the dimensions of the preferred embodiment 130. The dimensions of the "USA" shape 130 comprise a minimum length of seven-eighths of an inch (⅞) long and a minimum of three-eighths of an inch (⅜) wide. The "USA" shaped device may be manufactured in an assortment of colors and/or textures. The "USA" shaped device may be interchanged with any combination of letters in the alphabet as to provide additional embodiments of the invention. In one embodiment of the invention, the "USA" shaped device may be manufactured in the colors of blue, red, and white or any combination thereof FIG. 7i illustrates a "GOP" shaped device, in accordance with one embodiment of the invention. FIG. 7i illustrates an exploded view of a "GOP" shape 132 as well as a "GOP" shape reflecting the dimensions of the preferred embodiment 134. The dimensions of the "GOP" shape 134 comprise a minimum length of seven-eighths of an inch (⅞) long and a minimum of three-eighths of an inch (⅜) wide. The "GOP" shaped device may be manufactured in an assortment of colors and/or textures. The "GOP" shaped device may be interchanged with any combination of letters in the alphabet as to provide additional embodiments of the invention. FIG. 7j illustrates a circle shaped device, in accordance with one embodiment of the invention. FIG. 7j illustrates an exploded view of a circle shape 136 as well as a circle shape reflecting the dimensions of the preferred embodiment 138. The dimensions of the circle shape 138 comprise a minimum length of seven-eighths of an inch (⅞) in diameter. The circle shaped device may be manufactured in an assortment of colors and/or textures. FIG. 7k illustrates an oval shaped device, in accordance with one embodiment of the invention. FIG. 7k illustrates an exploded view of an oval shape 140 as well as an oval shape reflecting the dimensions of the preferred embodiment 142. The dimensions of the oval shape 142 comprise a minimum length of seven-eighths of an inch (⅞) long and a minimum of three-eighths of an inch (⅜) wide. The oval shaped device may be manufactured in an assortment of colors and/or textures.

Additional shapes may include, but are not limited to round shapes, anchors, letters of alphabets, combinations of letters of alphabets, phrases, angels (including cherubs, cupids, and angel wings), amusement park rides (including ferris wheels, merry-go-rounds, carousel horses, etc.), farm or zoo animals (either in entirety or individual portions, such as the head), Asian symbols, aquatic life (including porpoises, seahorses, starfish, etc.), balls from every sport, barbwire, beach items (flip flops, umbrellas, palm trees, seashells, etc.), birds including birds of prey (such as owls), birthstones, body parts, bows, Buddhas, buttons, Cameos, card shapes, Celtic symbols, coffee mugs, compass symbols, cupcakes, crowns, tiaras, Christian symbols, destruction symbols (such as swords, guns, fire, and/or the like), dinosaurs, dollar signs, dominoes, dragons, holiday symbols (for Valentine's Day, St. Patrick's Day, Easter, 4$^{th}$ of July, Halloween, Thanksgiving, Christmas, etc.), faces (such as happy face, smiley face, big lips only, facial profile, etc.), flags, mystical fantasy shapes (mermaids, fairies, pixies, unicorns, genies, phoenix, etc.), fraternity and sorority items (Greek letters, mascots, symbols, flowers), flowers including fleur-de-lis, fruits, golf carts, geometric shapes (including diamond, oval, round, rectangle, square, etc.), Greek key patterns, birthday symbols, hats, hearts of multiple varieties, insects (butterflies, dragonflies, ladybugs, etc.), keys (including Ankh), kites, leaves, trees, magnets, mascots from teams (professional, minor league, college, high school and the like), megaphones, musical notes, cartoon characters, comic book characters, patriotic symbols, paw prints, peace symbols, planets as well as sun and moon (crescent and full), princesses and accessories (castles, wands, etc.) ribbons, safety symbols, sky pictures, stars (including Moravian), sunglasses (including aviator), sweet treats (ice cream cones, milk shakes, sundaes, etc.), team loyalty, tear drop, transistor radios, tribal, university and college emblems and symbols, vehicles (including cars, motorcycles, bicycles in single and built for two, tricycles, boats, etc.), weather symbols (including rainbow, lightning bolt, snowflake, etc.), zodiac signs, circles, democratic political party symbols, republican political party symbols and/or the like, western symbols (horse bridal bit, horseshoe, cowboy boot, etc.), states, and/or the like.

The implementations of the shapes are notably different than the rectangular or oblong shaped device described with respect to FIG. 1. Therefore, the device size may vary such that the exact dimensions for each of the various shapes are determined by the shape itself. In some embodiments of the rectangular or oblong shaped device, the length may be a minimum of seven-eighths of an inch (⅞) long (e.g. longitudinal, vertical) and the width may be a minimum of three-eighths of an inch (⅜) wide (e.g. horizontal, transverse). In other embodiments of a round shaped device, the diameter may be seven-eighths of an inch (⅞) across. As such, the dimensions of the preferred embodiments may provide a base measurement for the dimensions of any other shape of the device.

FIG. 2 generally represents a device for positioning jewelry in accordance with one embodiment of the present invention. The device may be in any of the shapes listed above and others not listed. The device may be constructed in layers. In the illustrated embodiment, the device may have up to five layers, including, from bottom to top, an optional pad layer 50, an adhesive layer 40, a material layer 30, an optional fabric layer 20 and a top decorative layer 10. It should be noted that one or more layers may not be used. As such, a single layer may serve the function of one or more layers. In one embodiment, the optional fabric layer 20 may function as both the fabric layer 20 and the material layer 30. For example, in an embodiment where the fabric layer 20 comprises a stable fabric, the fabric layer 20 may function as both the fabric layer 20 and the material layer 30.

The bottom layer is an optional pad layer 50. It is a layer in the device that provides a padded region wherein the clasp of the jewelry may rest. The pad layer 50 may be comprised of cotton or another padded fiber. The pad may be square or round in shape. A round pad layer 50 may be three-eighths of an inch (⅜) in diameter. A square pad layer 50 may have sides that are approximately three-eighths of an inch (⅜) in length. Whether the pad layer 50 is square or round, the adhesive layer 40 and material layer 30 should probably extend at least two-eighths (2/8) of an inch past all sides of the pad layer 50 in order to provide adequate adhesion for the device. The optional pad layer 50 may be positioned in the center of the device. In one embodiment, the optional pad layer 50 may be scented. In another embodiment, the optional pad layer 50 may be unscented. In an embodiment where the optional pad layer 50 is unscented the user may apply cologne or perfume, as desired, to the unscented pad. In another embodiment where the optional pad layer 50 is unscented the user may apply a physician approved medication to the unscented pad.

The next layer is an adhesive layer 40. The device may attach to the skin via chemical or mechanical means. In an embodiment where the device attaches to the skin via chemical means, the adhesive may be waterproof. In another embodiment where the device attaches to the skin via chemical means, the adhesive may be skin-safe. In an embodiment where the device attaches to the skin via chemical means, the adhesive may be long lasting. In an embodiment where the device attaches to the skin via mechanical means, the means for attachment may include static electricity. In another embodiment where the device attaches to the skin via mechanical means, the means for attachment may include a self-securing plastic or silicone. The adhesive layer 40 may include a non-stick disposable film that may be peeled off by the individual prior to application. In one embodiment, the device may be placed on the non-stick disposable film using a kiss cut configuration. The adhesive located on the adhesive layer 40 may be a biomedical approved pressure sensitive adhesive. In this way, an individual may apply pressure to the device in order for the device to properly adhere to the skin. The adhesive layer 40 may be applied to an individual's skin, such that the clasp of the jewelry is located in the center of the device. The adhesive layer 40 may then be pressed into position by the individual. The adhesive layer 40 may be hypoallergenic (e.g., free of possible allergens), and irritant-free so as not to aggravate the skin of any individual who may come in contact with it. The adhesive layer 40 may further be water proof, so that the adhesive layer 40 may provide adhesion even when the individual gets the device wet. For example, the adhesive layer 40 may provide adhesion for the device even when an individual may use the device on a bracelet. In this way, the waterproof nature of the adhesion will allow the device to maintain position even with numerous washings of the individual's hands and wrists or during moderate to vigorous activities that result in bodily perspiration.

There are several functional aspects to the pad layer 50. First, the pad layer 50 allows the clasp to be protected. In this way, the adhesive from the adhesive layer 40 may not collect on the clasp and hinder the use of the clasp. Second, the pad layer 50 may provide protection to the other layers of the device. For example, the clasp of the jewelry may not rub on the top layers of the device causing tearing, ripping, or fading of the color or image on the device when the pad layer 50 is in place. Third, the pad layer 50 may provide a scent reservoir for colognes or perfumes. The scent may be any cologne or perfume available. The scents may be applied by the individual or by the manufacturer. When using the unscented device, the individual may add the cologne or perfume of her choice to the pad of the device. The pad layer 50 may be saturated by the scent and thus may provide consistent fragrance throughout the day. In this way the perfume or cologne may not lose its fragrance throughout the day, but instead be continuously providing the odor of the perfume or the cologne all day long. Third, the pad layer 50 may provide a means of applying topical medication. For example, if the individual may be attempting to quit smoking, the pad layer 50 may provide the proper medication, such as that provided by a quit smoking patch, to the individual wearing the device.

The material layer 30 provides the structural integrity to the device and supports the optional pad layer 50, the adhesive layer 40, the optional fabric layer 20, and the optional top decorative layer 10. In one embodiment the material layer 30 may include, but not be limited to, a soft pliable silicone or soft pliable plastic. In one embodiment, the plastic may be foam. In another embodiment, the plastic may be sponge. In another embodiment, any petroleum based plastic may be used. The material may be "flat" with even thickness of the device or 3-D with variable thickness of the device. The material may be chemically or mechanically bonded to the skin. An example of a device of even thickness would be a star that is one-sixteenth (1/16) of an inch thick though out. An example of a device of variable thickness is a starfish that would be one-sixteenth (1/16) of an inch thick on the edges, two-sixteenths (2/16) of an inch thick moving centrally, and three-sixteenths (3/16) of an inch thick in the center. Another example of a 3-D device with variable thickness would be a star that has 3 layers, one on top of the other. The star closest to the skin could be fifteen-sixteenths (15/16) of an inch thick and pink in color, the next star that is centered on top of the bottom star could be thirteen-sixteenths (13/16) of an inch thick and green in color and the top star could be eleven-sixteenths (11/16) of an inch thick and purple in color. The material may be scented or unscented. The material on a device may be a single color, multiple colors, plain, or patterned such as animal print, argyle, checks, geometric, hounds tooth, paisley, polka dots, stripes, swirls, zigzags and the like. The material may be opaque, translucent, or metallic. The material may glow-in-the dark or change-colors-in-the-sun. In some cases, the material layer may be a textile such as cotton, polyester, rayon, satin, silk, etc.; felt; foil; metal such as aluminum, brass, bronze, gold, gold leaf, liquid silver, pewter, platinum, rose gold, silver, silver leaf, silver plate, steel, sterling silver, tin, etc.; and ribbon such as grosgrain, nylon, organza polyester, rick rack, satin, silk, blends, etc.

The optional fabric layer 20 may be flexible in order to conform to the shape of the location the individual applies the device, such as the neck, wrist, ankle, etc. When used, the fabric layer would most likely attach to silicone or some type of plastic 30. The optional fabric layer 20 may be made of textiles such as cotton (including, but not limited to, chenille, appliques, chintz, denim, felt, flannel, canvas, blends), glitter, linen, leather, lace, mohair, nylon, polyester, rayon, satin, sequin, silk, suede, tulle, ultra suede, Velcro®, cork, foil, metals (including, but not limited to, aluminum, brass, bronze, gold, gold leaf, pewter, platinum, rose gold, silver, silver leaf, silver plate, sterling silver, tin, copper, steel and the like), ribbon (including, but not limited to grosgrain, nylon, organza, polyester, satin, silk, blends and the like), mesh, wood (solid, woven, or laser cut) and/or the like. In one embodiment, the metal material may be solid, engraved or laser cut. The laser cut patterns may include lace, scroll, vintage and the like. A textile, cork, foil, ribbon, wood, or mesh may be a single color, multiple colors, plain, or patterned (including, but not limited to, animal prints, argyle, checks, hounds tooth, paisley, polka dots, stripes, zigzags, swirls and the like). When plain, the fabric may be compatible for painting, printing, or stamping by the consumer. Other options include metallic, change-colors-in-the-sun, and glow-in-the-dark.

In some embodiments of the invention, the optional top decorative layer 10 is positioned on top of the fabric layer 20 or material layer 30. In other embodiments of the invention, the optional top decorative layer 10 is within the fabric layer 20 or the material layer 30. The top decorative layer 10 may be, but is not limited to prints or embossing, colors, clear coating, glow-in-the-dark, images, etc. that are provided on top or within the fabric layer 20 or material layer 30. Prints or embossing may be any type of printed letter, word or phrase in any color, dialect, or font; symbol, image, picture, tattoo, pattern, etc. that may be printed on or within the fabric layer 20 or the material layer 30 depending on the element used in the fabric layer 20 or the material layer 30. The top decorative layer 10 may also include hard plastic protrusions (e.g., in shapes such as cameos, diamonds, dots, hearts, squares, stars, triangles, etc.), glitter, semi-precious and precious gems, synthetic semi-precious and precious gems (e.g., birthstones such as ruby, sapphire, pearl, diamond, etc. as well as multiple others, but not limited to amber, lapis, onyx, rhodocrosite, tourmaline, etc. in an array of cuts including cameo), crystals, synthetic crystals, stone, synthetic stone, shells, synthetic shells, rhinestones, ribbons, printing, sequins, feathers including faux, fur including faux, beads (plastic, metal, wood, etc.), buttons, glass pieces, faux mirrors, studs, cork, needlework (cross-stitch, embroidery, needlepoint, tatting), yarn including pom poms, cord, wire, charm hook with or without a charm, etc. protruding above the surface of the fabric layer 20 and/or the material layer 30 and thereby providing a three dimensional appearance to the device. In some embodiments of the invention the top decorative layer 10 may include an additional adhesive. The additional adhesive may provide the user with a means for repeatedly interchanging prints and/or image or the like wherein the interchangeable item would be manufactured out of a material capable of attaching to the adhesive and capable of being easily removed.

FIG. 3 generally represents a device for positioning jewelry in accordance with one embodiment of the present invention. The device may be in any of the shapes listed above. The device may be constructed in layers. FIG. 3 illustrates similar layers as with respect to FIG. 2, including, from bottom to top, an optional pad layer 50, a self-securing plastic or silicone 90, an optional fabric layer 20, and a top decorative layer 10.

The second layer is a self-securing plastic or silicone layer 90. The self-securing plastic or silicone layer 90 may include a non-stick disposable film that may be peeled off by the individual prior to application. The attachment properties located on the self-securing plastic or silicone layer 90 may be an adhesive-free pressure sensitive attachment mechanism. In this way, an individual may apply pressure to the device in order for the device to properly attach to the skin. It attaches by mechanical means. The self-securing silicone layer 90 may be applied to an individual's skin, such that the clasp of the jewelry is located in the center of the device. The self-securing plastic or silicone layer 90 may then be pressed into position by the individual. The self-securing plastic or silicone layer 90 may be hypoallergenic (e.g., free of latex, and/or other possible allergens), so as not to aggravate the skin of any individual who may come into contact with it. The self-securing plastic or silicone layer 90 may further be water proof, so that the self-securing plastic or silicone layer 90 may provide adhesion even when the individual gets the device wet. For example, the self-securing plastic or silicone layer 90 may provide adhesion for the device even when an individual may use the device on a bracelet. In this way, the waterproof nature of the self-securing plastic or silicone layer 90 will allow the device to maintain position even with numerous washings of the individual's hands and wrists or during moderate to vigorous activities that result in bodily perspiration. Furthermore, the waterproof nature of the self-securing plastic or silicone layer 90 will allow the device to be cleansed with the use of hot water and a mild soap to remove lint and oil, allowing the device to retain its attachment properties for repeated use. In another embodiment of the invention, the third layer 30, as depicted in FIG. 2 or the second layer 90 as depicted in FIG. 3, (i.e., 30 in FIG. 2 and 90 in FIG. 3) may be substituted with a plastic or silicone material already containing adhesive. This plastic or silicone material may provide a means for adding extra adhesive to the plastic or silicone. In alternative embodiments of the invention, an additional bottle of adhesive may be provided such that the adhesive may be applied to the bottom layer thus increasing the longevity of the device. The bottle of adhesive may contain an adhesive, with properties similar to rubber glue, which is safe for skin application.

In another embodiment of the invention, the second layer 40, as depicted in FIG. 2, may be substituted with a non-adhesive material that contains similar attachment properties capable of securing an item to the skin of an individual. Useful non-adhesive materials may include, but are not limited to, a polyurethane material, plastic, caulk (brush on), caulk (molded), rubber, micro fiber, a hook-and-loop material such as Velcro®, silicone polymers, or a combination of silicone oils and boric acid. The non-adhesive material layer may include a protective covering such as non-stick disposable film that may be removed by the individual prior to application. The non-adhesive material layer may be applied to an individual's skin, such that the clasp of the jewelry is located in the center of the device. The non-adhesive material layer may then be pressed into position by the individual. The non-adhesive material layer may be hypoallergenic (e.g., free of latex and/or other possible allergens) and free of irritants so as not to aggravate the skin of any individual who may come in contact with it. The non-adhesive material layer may further be water proof, so that the layer may provide adhesion even when the individual gets the device wet. For example, the non-adhesive material layer may provide adhesion for the device even when an individual may use the device on a bracelet. In this way, the waterproof nature of non-adhesive material layer will allow the device to maintain position even with numerous washings of the individual's hands and wrists or during moderate to vigorous activities that result in bodily perspiration.

In some embodiments of the invention, as depicted in FIG. 4 the device may include a groove 60 for the jewelry to fit into. FIG. 4 illustrates similar layers as with respect to FIG. 2, including an optional pad layer 50, an adhesive layer 40, a material layer 30, an optional fabric layer 20, and an optional top decorative layer 10. All of these layers have the same features as described above with respect to FIG. 2. In the embodiment illustrated in FIG. 4A, a groove 60 is provided within the optional pad layer 50, the adhesive layer 40, the material layer 30, and possibly a portion of the optional fabric layer 20. In another embodiment illustrated in FIG. 4B, a groove 60 is provided within the optional pad layer 50, the adhesive layer 40, the material layer 30, and the optional fabric layer 20. The groove 60 may provide an area for the chain or rope of the jewelry to fit into. The grove may be located on any edge of the device. In this way, the individual may not see any protrusions from the underlying piece of jewelry when viewing the decorative layer 10 of the device. For example, a bulge, lump, or crease may be seen in the decorative layer 10 of the device when the device is positioned over a necklace. The bulge, lump, or crease may be formed from the clasp and chain of the necklace itself being positioned under the device. If the individual selects a device with a pattern or various characters on the device, the bulge, lump, or crease may detract from the esthetic features of the device. Providing a groove 60 for which the necklace chain and clasp rests in may eliminate the bulge, lump, or crease that may otherwise have been created. In this way, a smooth top decorative layer 10 may be visualized without obstruction from a bulge, lump, or crease. In an alternative embodiment of the invention, the adhesive layer 40 may comprise a soft plastic or silicone having similar properties and it will conform to the shape of any necklace chain or clasp pressed into it.

FIG. 5 illustrates a necklace positioning device in use, in accordance with embodiments of the invention. In FIG. 5 a necklace 72 is draped around the neck 14 of an individual. Once the individual has hooked the clasp 80 of the necklace 72 and made sure that it is hooked securely, the necklace clasp 80 is moved to the desired location on the neck 14 of the individual wearing the necklace 72. For example, some necklaces 72 may sit lower on the neck 14, near the shoulders, whereas other necklaces 72 may sit higher on the neck 14. Once the individual has positioned the necklace clasp 80 in the preferable location on the neck 14, the individual may select the device 12 in the shape and color with or without any additional features that she wishes to wear. For example, if she is going to a formal dinner, she may select a clear oval device topped with synthetic pearls and rimmed with a gold metal wire 12. If she is going out with her friends for an evening out, she may wear a rhinestone studded pink cancer awareness ribbon device 12. In the example illustrated in FIG. 5, the individual has selected a heart shaped rectangular device 12. For example, in one embodiment the device may include 5 layers such as a cowboy hat with a pad for cologne choice, chemical adhesive, silicone (in the shape of a cowboy hat) topped with blue denim (in the shape of a cowboy hat), decorated with a rim of brass studs. Once the shape, color, etc. is determined by the individual, the individual may peel off the film attached to the bottom of the adhesive layer. If there is an unscented pad, she may add her fragrance of choice to the pad only, not allowing it to get on the adhesive. She would then align the middle of the device 12 with the clasp 80 of the necklace 72 and attach the device 12 with the adhesive side towards the skin on the back of the neck using pressure.

FIG. 6 offers an alternative embodiment of the invention. As described briefly above, in this alternative embodiment, the device may be shaped similar to an "I". In this alternative embodiment, the device has an upper body 65, a lower body 70, and a vertical connection body 75. The upper body 65 may be comprised of the same or similar layers as described above with respect to FIG. 2. That is, in order from bottom to top, an optional pad layer 50, an adhesive layer 40, a material layer 30, an optional fabric layer 20, and an optional top decorative layer 10. The lower body 70 may have the same or similar layers as described above with respect to FIG. 2. However, the layers of the lower body 70 may be in opposite order. For example, the upper layer may be the adhesive layer 40, then the material layer 30, followed by an optional fabric layer 20, and finally the optional top decorative layer 10 on the bottom face of the lower body 70. The individual may peel off a non-stick disposable film from the adhesive layer of the upper body 65 and attach the upper body 65 of the device to her skin. In the embodiment illustrated in FIG. 6, the upper body 65 may be adhered to the back of an individual's neck. In this way, the upper body 65 may be adhered to the individual's skin while the lower body 70 and connection body 75 are not adhered to the skin. The individual may position the necklace 72 and necklace clasp 80 in the desired location around her neck and near the center of the connection body 75 of the device. The connection body 75 may have an indicator as to where the clasp 80 of the necklace 72 may be positioned.

Once the necklace 72 is in the desired position around an individual's neck and the clasp 80 is located in the proper position on the connection body 75, the film on the adhesive layer of the lower body 70 may be peeled off and the lower body 70 may be folded, about the connection body 75 such that the adhesive layer 40 of the lower body 70 is positioned in the center of the upper body 65. The adhesive layer 40 of the lower body 70 may adhere to the upper body 65. Folding of the lower body 70 in this way completely encloses the clasp 80 of the necklace 72 as well as a portion of the necklace 72 extending in each direction away from the clasp 80. Since the connection body 75 does not have any adhesive layer, the clasp 80 is protected from residue build up from an adhesive substance. In an alternative embodiment, the upper body 65 and the lower body 70 may comprise a magnetic means for enclosing the clasp 80 of the necklace 72 as well as a portion of the necklace 72 extending in each direction away from the clasp 80.

Once the lower body 70 is folded up and adhering to the center of the upper body 65, the top decorative layer of each the upper body 65 and the lower body 70 are exposed. Therefore, any print, color, clear coating, glow-in-the-dark, image, printed letter, symbol, image, picture, pattern, hard plastic protrusions (e.g., in shapes such as diamonds, dots, hearts, squares, stars, triangles, etc.), glitter, rhinestones, ribbons, printing, sequins, etc. found on the top decorative layer are exposed for both the upper body 65 and the lower body 70.

Further, the shapes detailed with respect to the device illustrated in FIG. 1 may also be provided to the individual in this embodiment. The shapes may include, but not be limited to round shapes, anchors, letters of alphabets, combinations of letters of alphabets, phrases, angels (including cherubs, cupids, and angel wings), amusement park rides (including Ferris wheels, merry-go-rounds, carousel horses, etc.), farm or zoo animals (either in entirety or individual portions, such as the head), Asian symbols, aquatic life (including porpoises, seahorses, starfish, etc.), balls from every sport, barbwire, beach items (flip flops, umbrellas, palm trees, seashells, etc.), birds including birds of prey (such as owls), birthstones, body parts, bows, Buddha, buttons, Cameos, card shapes, Celtic symbols, coffee mugs, compass symbols, cupcakes, crowns, tiaras, Christian symbols, destruction symbols (such as swords, guns, fire, and/or the like), dinosaurs, dollar signs, dominoes, dragons, holiday symbols (for Valentine's Day, St. Patrick's Day, Easter, $4^{th}$ of July, Halloween, Thanksgiving, Christmas, etc.), faces (such as happy face, smiley face, big lips only, facial profile, etc.), flags, mystical fantasy shapes (mermaids, fairies, pixies, unicorns, genies, phoenix, etc.), fraternity and sorority items (Greek letters, mascots, symbols, flowers), flowers including fleur-de-lis, fruits, golf carts, geometric shapes (including diamond, oval, round, rectangle, square, etc.), Greek key patterns, birthday symbols, hats, hearts of multiple varieties, insects (butterflies, dragonflies, ladybugs, etc.), keys (including Ankh), kites, leaves, trees, magnets, mascots from teams (professional, minor league, college, high school and the like), megaphones, musical notes, cartoon characters, comic book characters, patriotic symbols, paw prints, peace symbols, planets as well as sun and moon (crescent and full), princesses and accessories (castles, wands, etc.) ribbons, safety symbols, sky pictures, stars (including Moravian), sunglasses (including aviator), sweet treats (ice cream cones, milk shakes, sundaes, etc.), team loyalty, tear drop, transistor radio, tribal, university and college emblems and symbols, vehicles (including cars, motorcycles, bicycles in single and built for two, tricycles, boats, etc.), weather symbols (including rainbow, lightning bolt, snowflake, etc.), zodiac signs, circles, democratic political party symbols, republican political party symbols and/or the like, western symbols (horse bridal bit, horseshoe, cowboy boot, etc.), states, and/or the like.

In some embodiments of the invention, the upper body 65 may provide the shape, while the lower body 70 may provide an exact mirror image of the shape across the connection body 75. For example, the upper body 65 may be in the shape of a heart. The lower body 70 may then be in the shape of an upside-down heart (mirrored across the longitudinal axis of the connection body 75). In this way, when the lower body 70 is folded over the connection body 75, a heart may be visualized. In other embodiments of the invention, the upper body 65 may provide the shape, while the lower body 70 may be a smaller section within the shape. In this way, when the lower body 70 may be folded about the connection body 75, such that the shape of the lower body 70 fits within the shape of the upper body 65, the shape of the upper body 65 and lower body 70 inside may both be viewed.

What is claimed is:

1. An apparatus for preventing movement of jewelry when on a user, the apparatus comprising:
    an attachment layer, wherein the attachment layer comprises an adhesive for attaching the apparatus to skin of the user;
    a protective layer, wherein the protective layer comprises a protective pad such that a clasp of the jewelry rest upon the protective pad and is protected from the attachment layer;
    a material layer, wherein the material layer comprises a material, wherein the material provides structural integrity to the apparatus such that the apparatus maintains a form with respect to the user's skin;
    a fabric layer, wherein the fabric layer comprises a fabric such that the fabric may provide additional structural integrity to the apparatus;
    a decorative layer, wherein the decorative layer comprises decorative elements; and
    an arrangement of layers, wherein the layers are arranged such that the protective layer is located closest to the skin of the user, wherein the attachment layer is located on the protective layer, such that the attachment layer adheres the protective layer to the apparatus, such that at least a portion of the attachment layer is exposed to the skin of the user, wherein the material layer is positioned upon the attachment layer, wherein the fabric layer is positioned upon the material layer, wherein the decorative layer is positioned upon the fabric layer, and wherein one or more layers may function as one or more different layers.

2. The apparatus of claim 1, wherein the adhesive for attaching the apparatus to skin of the user is a chemical.

3. The apparatus of claim 2, wherein the attachment layer further comprises a non-stick disposable film attached to the adhesive, such that the non-stick disposable film is removable by the user prior to application.

4. The apparatus of claim 1, wherein the apparatus further comprises a groove, wherein the groove removes a middle portion of one or more layers such that a chain of the jewelry and the clasp of the jewelry is positioned in the groove.

5. The apparatus of claim 1, wherein the apparatus is rectangular shaped, and wherein dimensions of the apparatus are three-eighths of an inch (⅜) wide by seven-eighths of an inch (⅞) long.

6. The apparatus of claim 1, wherein the apparatus is round in shape, and wherein a diameter of the apparatus is seven-eighths of an inch (⅞).

7. The apparatus of claim 1, wherein the apparatus is I-shaped, wherein the apparatus comprises:
    an upper portion that adheres to the skin of the user; and
    a lower portion, that upon folding the lower portion over onto the upper portion adheres to the upper portion such that the clasp of the jewelry is completely enclosed by a stem of the I-shape.

8. A method of manufacturing an apparatus for preventing the movement of jewelry on skin of a user, the method comprising:
    providing an attachment layer, wherein the attachment layer comprises an adhesive for attaching the apparatus to the skin of the user;
    providing a protective layer comprising a protective pad such that a clasp of the jewelry is positioned within the protective pad and is protected from the adhesive layer;
    providing a material layer, the material comprising a plastic for providing structural integrity to the apparatus such that the apparatus maintains form in connection with the skin of the user;
    providing a fabric layer, comprising silicone that provides structural integrity to the apparatus;
    providing a decorative layer, wherein the decorative layer comprises decorative elements; and arranging layers, wherein the layers are arranged such that the protective layer is located in contact with the skin of the user, the attachment layer positioned upon the protective layer, the material layer positioned upon the attachment layer, the fabric layer positioned upon the material layer, and the decorative layer positioned upon the fabric layer such that the decorative layer is visible upon use of the apparatus, and wherein one or more layers may function as one or more different layers.

9. The method of claim 8, wherein the attachment layer comprises an adhesive for attaching the apparatus to the skin of the user.

\* \* \* \* \*